July 17, 1923.

F. O. ARNOLD

COUPLING

Filed May 16, 1921

Inventor
Frank O. Arnold
Geo Stevens
Attorney

Patented July 17, 1923.

1,461,958

UNITED STATES PATENT OFFICE.

FRANK O. ARNOLD, OF DULUTH, MINNESOTA.

COUPLING.

Application filed May 16, 1921. Serial No. 470,094.

*To all whom it may concern:*

Be it known that I, FRANK O. ARNOLD, a citizen of the United States, residing at Duluth, in the county of St. Louis and State of Minnesota, have invented certain new and useful Improvements in Couplings, of which the following is a specification, reference being had therein to the accompanying drawing.

This invention relates to coupling devices and has special reference to a coupling for hose or pipe.

The object of the invention is to produce a coupling requiring the least effort possible in either making or breaking same, the advantages of which are probably more apparent in the use of such a coupling in connection with water hose such as used for fire fighting purposes or the like.

Other objects and advantages will appear in the further description of the invention.

Referring to the accompanying drawing forming part of this application in which like reference characters indicate like parts:

Figure 1:
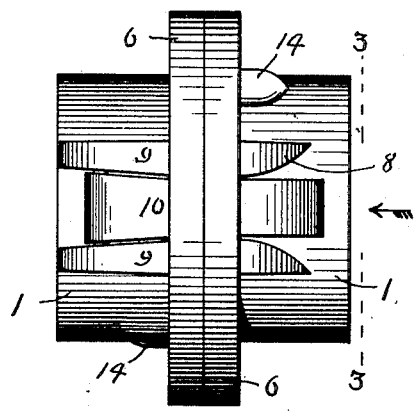
Figure 1 is a side view of one of the improved couplings shown united.
Figure 2:
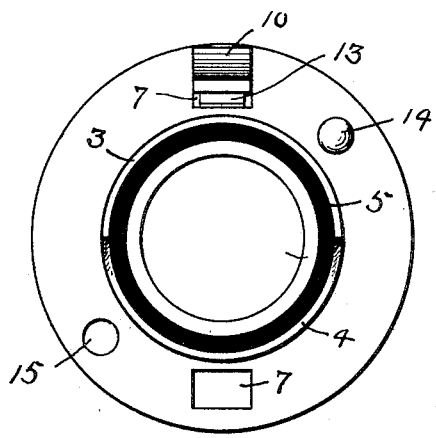
Figure 2 is an inner face view of one of the cooperative halves of the coupling.
Figure 3:
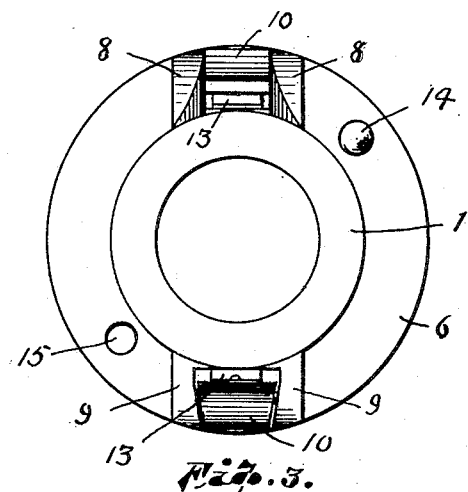
Figure 3 is an end view on the line 3—3 Figure 1.
Figure 4:
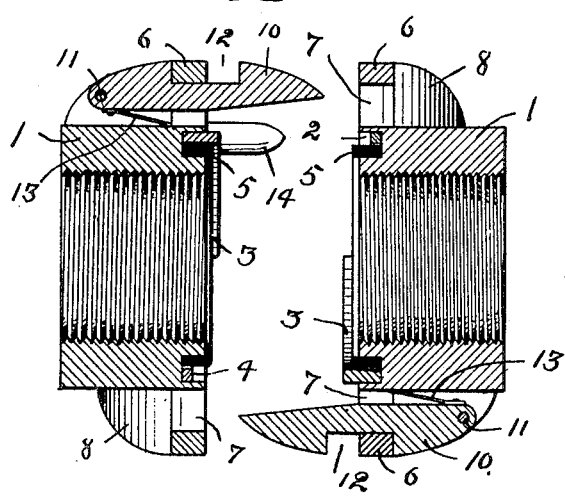
Figure 4 is a vertical central sectional view of the two parts of the coupling facing each other ready for assembly.

The coupling comprises two identical cooperatively engageable halves, each half comprising a cylindrical internally screw threaded body portion 1 which may be attached in the usual manner to the exterior of a screw threaded pipe or hose. Within the inner face of the body portion 1 is formed an annular recess 2 which is rectangular in cross section and into the outer approximate half of which is tightly fitted an annular packing ring, the circumferential half 3 of which extends beyond the face of the body portion, while the opposite circumferential half 4 lies wholly within the recess 2, the width of the latter half being only approximately half the depth of the recess. Being of this form and disposed in relatively reverse positions in each half of the coupling, said halves may be united face to face with the half 3 of each packing ring extending within the corresponding portion of the recess 2 in the opposite half of the coupling, resulting, when united, in a substantially continuous interlocking packing ring.

Inside of this ring and snugly fitted within the remaining portion of the recess 2 in each half of the coupling is a rubber gasket 5, it being made to project slightly beyond the inner face of the two halves of the coupling so as to forcibly impinge each other when the two halves of the coupling are united, simultaneously with the meeting of the opposing edges of the packing rings.

Each half of the coupling is provided with an annular flange 6 extending outwardly from the body portion adjacent the inner face thereof, said flange forming the major portion of the inner face of each half of the coupling.

Two like rectangularly shaped holes 7 are formed through the flange 6 upon each coupling, they being diametrically opposed, and adjacent the sides of one hole extending backwardly and of arcuately flaring shape, are the protection lugs 8, while similarly positioned in relation to the opposite hole are the somewhat similarly shaped lugs 9, intermediate of which are pivoted the holding dogs 10 upon the pin 11. The dogs 10 have formed therein notches 12 in which normally occur the outer wall of the flange 6 which surrounds the hole 7, each dog being rockable within said hole as it is of less depth than the hole and is pivotally mounted on its supporting pin 11. A small flat spring 13 is attached at one end to the inner end of the dog inwardly of the pivotal point 11 and the opposite free end of the spring is engaged against the body portion 1 of the coupling. This spring is for the purpose of holding the free end of the dog normally outwardly.

Now as the two halves of the coupling are identical in construction, it is apparent that when they are united, the free end of the dog on one half will register within the hole 7 through the flange 6 of the opposite half, and said opposite half will engage the other half, the dogs 10 becoming interlocked behind their respective registering openings and the halves thus tightly held together with the gaskets 5 meeting simultaneously with the impingement of the edges of the packing rings.

When in this position the free ends of the dogs will occur intermediate of the protection lugs 8 and extend slightly beyond same where they may be readily engaged by the finger or thumb of one manipulating the coupling for forcing the ends of the dogs downwardly to free same from interlocking engagement with the flange when the halves of the coupling may be readily separated. The lugs 8 also serve as a protection, ordinarily, from an object striking against the free end of the dogs and unintentionally releasing the coupling.

Fixed within the flange of each half of the coupling and projecting towards the other half of the coupling is a guiding pin 14 which registers within a corresponding hole 15 in the opposite flange for reinforcement of the coupling and to prevent undue torsional stress upon the dogs 10.

When the two halves of a coupling are thus united in connecting a hose or pipe and pressure is applied thereto, the rubber gasket will be expanded or forced outwardly against the inner faces of the annular packing rings and a tight joint result, and inasmuch as the gaskets thus impinge the inner faces of the rings, it becomes nonessential to make the gaskets or rings abnormally close fitting in respect to their cooperative engagement, thus permitting of the two halves of the coupling being readily united by hand.

From the foregoing it is evident that I have devised a simple, quickly adjustable and reliable coupling.

Having thus described my invention, what I claim as new and desire to secure by Letters Patent, is:

1. The combination with a coupling of the character described comprising two like separable flanged halves, of means for automatically holding the halves together when united comprising a pivotally mounted depressible dog extending through one of the two diametrically opposed holes in the flange of each half.

2. The combination with a coupling of the character described comprising two like separable flanged halves, each flange having two diametrically opposed openings therethrough, of means for automatically holding the halves together when united comprising a depressible dog extending through one of said holes in each half and registrable within the unoccupied hole in the other half when the two latter are united, and cylindrical pointed guiding pins one within each half and registrable with the hole in the other half.

In testimony whereof I hereunto affix my signature in the presence of two witnesses.

FRANK O. ARNOLD.

Witnesses:
S. C. BRONSON,
S. GEO. STEVENS.